(12) United States Patent
Menke

(10) Patent No.: US 11,400,900 B2
(45) Date of Patent: Aug. 2, 2022

(54) SELECTIVE FRICTION BRAKE ALLOCATION DURING TAXI

(71) Applicant: HAMILTON SUNDSTRAND CORPORATION, Charlotte, NC (US)

(72) Inventor: Michael J. Menke, Roscoe, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 83 days.

(21) Appl. No.: 16/807,748

(22) Filed: Mar. 3, 2020

(65) Prior Publication Data

US 2021/0276517 A1 Sep. 9, 2021

(51) Int. Cl.

| | |
|---|---|
| *B60T 8/17* | (2006.01) |
| *F16D 66/02* | (2006.01) |
| *B60T 8/172* | (2006.01) |
| *B60T 8/32* | (2006.01) |
| B60T 8/1755 | (2006.01) |
| B60T 8/1763 | (2006.01) |

(52) U.S. Cl.
CPC ............ *B60T 8/1703* (2013.01); *B60T 8/172* (2013.01); *B60T 8/325* (2013.01); *B60T 8/17551* (2013.01); *B60T 8/17636* (2013.01); *B60T 2270/413* (2013.01); *F16D 66/022* (2013.01); *F16D 66/027* (2013.01)

(58) Field of Classification Search
CPC ........ B60T 8/172; B60T 8/1703; B60T 8/325; B60T 17/221; B64C 25/42; F16D 66/02; F16D 66/021; F16D 66/022; F16D 66/026; F16D 66/027
See application file for complete search history.

(56) References Cited

U.S. PATENT DOCUMENTS

| | | | |
|---|---|---|---|
| 5,172,960 A | | 12/1992 | Chareire |
| 5,217,282 A | * | 6/1993 | Guichard .................. B60T 8/00 188/382 |

(Continued)

FOREIGN PATENT DOCUMENTS

| | | |
|---|---|---|
| DE | 69414693 | 4/1999 |
| EP | 0384071 | 8/1990 |

(Continued)

OTHER PUBLICATIONS

European Patent Office, European Search Report dated Jun. 18, 2021 in Application No. 21158991.6.

*Primary Examiner* — Thomas J Williams
(74) *Attorney, Agent, or Firm* — Snell & Wilmer L.L.P.

(57) ABSTRACT

An aircraft or other vehicle includes a system and method for selectively allocating which friction brakes of a plurality of friction brakes are utilized in response to a braking demand. Said differently, the present disclosure provides a system and method that includes dynamically switching which friction brakes of a plurality of friction brakes are active (e.g., in use) at a given time in response to a braking demand. This dynamic switching may not only be based on the received braking demand (e.g., from a pilot or auto-braking module), but may also be based on one or more of the following: respective measured brake parameters of the plurality of friction brakes (e.g., temperature, extent-of-wear), aircraft parameters, external parameters, and respective calculated brake conditions.

19 Claims, 3 Drawing Sheets

(56) References Cited

U.S. PATENT DOCUMENTS

| | | | |
|---|---|---|---|
| 5,845,975 A * | 12/1998 | Wells | B60T 7/16 |
| | | | 303/126 |
| 6,938,857 B2 | 9/2005 | DeVlieg | |
| 9,789,974 B2 | 10/2017 | Burte et al. | |
| 2003/0102191 A1* | 6/2003 | DeVlieg | B60T 8/325 |
| | | | 188/1.11 W |
| 2004/0065776 A1* | 4/2004 | DeVlieg | B60T 8/00 |
| | | | 244/111 |
| 2006/0191751 A1 | 8/2006 | Miller et al. | |
| 2006/0226698 A1 | 10/2006 | Riebe | |
| 2010/0286881 A1* | 11/2010 | Cahill | F16D 66/026 |
| | | | 701/70 |
| 2011/0226569 A1* | 9/2011 | Devlieg | B60T 8/1703 |
| | | | 188/158 |
| 2013/0175403 A1* | 7/2013 | Spray | B60T 8/1703 |
| | | | 244/235 |
| 2018/0079402 A1* | 3/2018 | Bruggemann | B60T 8/171 |
| 2019/0077500 A1* | 3/2019 | Kipp | B60T 8/171 |
| 2019/0263374 A1 | 8/2019 | Bill et al. | |

FOREIGN PATENT DOCUMENTS

| | | | |
|---|---|---|---|
| EP | 3088266 | 11/2016 | |
| EP | 3088266 A1 * | 11/2016 | B64C 25/42 |
| EP | 3296170 | 3/2018 | |
| FR | 2672559 A1 * | 8/1992 | B60T 13/665 |
| GB | 2311108 A * | 9/1997 | B60T 7/16 |
| WO | WO-2018026745 A1 * | 2/2018 | F16D 66/00 |

* cited by examiner

SELECTIVE FRICTION BRAKE ALLOCATION DURING TAXI

FIELD

The present disclosure relates to optimizing brake wear, and more specifically to selective allocation of friction brake activation for aircraft brakes during taxi.

BACKGROUND

Vehicles, such as aircraft, often include one or more wheels that include respective friction brakes. The multiple friction brakes on a vehicle may experience undesirable simultaneous wear-out and/or accelerated wear and damage during their lifetime. For example, if certain friction brakes are utilized more or less frequently than others or experience comparatively higher or lower temperatures than other friction brakes on the vehicle, such brakes will be more susceptible to failure and/or may warrant replacement at shorter intervals than others or at the same interval as others. If friction brake temperature reaches excessive levels, cockpit alerts may occur, brakes or associated components may fail, fuse plugs may melt, brake fading may occur, brake seizure/welding may ensue, and/or special cooling procedures may be warranted for the next departure. In other words, if certain friction brakes are utilized more or less frequently than others or experience comparatively higher or lower temperatures than other friction brakes on the vehicle, increased operational, maintenance, and materials costs may adversely affects the operational efficiency and availability of the vehicle.

SUMMARY

In various embodiments, the present disclosure provides an aircraft comprising a landing gear having a plurality of wheels and a plurality of friction brakes respectively coupled to the plurality of wheels. Each friction brake of the plurality of friction brakes may have a brake material coupled to a respective wheel of the plurality of wheels. The aircraft may further include a controller, and the controller may be configured to communicate with a tangible, non-transitory memory, the tangible, non-transitory memory having instructions stored thereon that, in response to execution by the controller, cause the controller to perform various operations. The various operations may include receiving, by the controller, a braking demand. Still further, the various operations may include selectively allocating, by the controller, which friction brakes of the plurality of friction brakes are utilized in response to the braking demand.

In various embodiments, wherein selectively allocating, by the controller, comprises selective activation of a first set of friction brakes of the plurality of friction brakes in response to the braking demand, wherein the first set of friction brakes comprises less than all friction brakes of the plurality of friction brakes such that a second set of friction brakes, which may include a single friction brake, is not utilized in response to the braking demand. In various embodiments, selectively allocating, by the controller, comprises dynamically switching which friction brakes of the plurality of friction brakes are active in response to respective measured brake parameters of the plurality of friction brakes.

In various embodiments, the aircraft further comprises a plurality of temperature sensors respectively coupled to the plurality of friction brakes, wherein each temperature sensor of the plurality of temperature sensors is configured to measure a temperature of a respective friction brake of the plurality of friction brakes. The respective measured brake parameters may comprise the temperatures of the plurality of friction brakes from the plurality of temperature sensors.

In various embodiments, selectively allocating, by the controller, comprises switching which friction brakes of the plurality of friction brakes are active to achieve and maintain the temperature of the plurality (or a subset of the plurality) of friction brakes within a range. The range may include a minimum temperature and a maximum temperature, wherein the minimum temperature is about 100° F. and the maximum temperature is about 2,000° F. In various embodiments, the range comprises a minimum temperature and a maximum temperature, wherein the minimum temperature is about 200° F. and the maximum temperature is about 1,500° F. In various embodiments, the range comprises a minimum temperature and a maximum temperature, wherein the minimum temperature is about 200° F. and the maximum temperature is about 1,000° F.

The aircraft may include a plurality of brake-wear sensors respectively coupled to the plurality of friction brakes, wherein each brake-wear sensor of the plurality of brake-wear sensors is configured to measure an extent-of-wear of a respective friction brake of the plurality of friction brakes. The respective measured brake parameters comprise the extent-of-wear of the plurality of friction brakes from the plurality of brake-wear sensors, according to various embodiments. In such embodiments, wherein selectively allocating, by the controller, comprises dynamically switching which friction brakes of the plurality of friction brakes are active in response to the extent-of-wear of the plurality of friction brakes to distribute and stagger wear to the plurality of friction brakes.

In various embodiments, the aircraft further comprises an aircraft sensor configured to measure an aircraft parameter of the aircraft, wherein the operations comprise receiving, by the controller, the aircraft parameter such that selectively allocating, by the controller, is in response to the aircraft parameter. The aircraft parameter may be at least one of a ground speed, an aircraft direction, a vehicle weight, a thrust reverser position, a spoiler position, a gas turbine engine power/speed setting, an auto-brake setting, and a braking configuration. The operations may further include receiving, by the controller, an external parameter such that selectively allocating, by the controller, is in response to the external parameter. The external parameter may be at least one of an outside static air temperature, an outside humidity, a vehicle altitude/pressure, an outside wind speed/direction, an arrival/departure airport/runway/gate, and a target brake wear % for each individual brake.

In various embodiments, the various operations performed by the controller include generating respective calculated brake conditions of the plurality of friction brakes in response to the braking demand and the respective measured brake parameters, wherein selectively allocating, by the controller, comprises dynamically switching which friction brakes of the plurality of friction brakes are active in response to the respective calculated brake conditions of the plurality of friction brakes.

Also disclosed herein, according to various embodiments, is a method that includes receiving, by a controller, a braking demand and selectively allocating, by the controller, which friction brakes of a plurality of friction brakes are utilized in response to the braking demand. The method may further include receiving, by the controller, measured respective brake parameters of the plurality of friction brakes, wherein selectively allocating, by the controller, comprises dynamically switching which friction brakes of the plurality of friction brakes are active in response to the respective measured brake parameters of the plurality of friction brakes. Still further, the method may include generating respective calculated brake conditions of the plurality of friction brakes in response to the braking demand and the respective measured brake parameters, wherein selectively allocating, by the controller, comprises dynamically switching which friction brakes of the plurality of friction brakes are active in response to the respective calculated brake conditions of the plurality of friction brakes. Also, the method may include receiving, by the controller, at least one of an aircraft parameter and an external parameter, wherein selectively allocating, by the controller, comprises dynamically switching which friction brakes of the plurality of friction brakes are active in response to the aircraft parameter and the external parameter.

Also disclosed herein, according to various embodiments, is an article of manufacture including a tangible, non-transitory computer-readable storage medium having instructions stored thereon that, in response to execution by a processor, cause the processor to perform the aforementioned method.

The forgoing features and elements may be combined in various combinations without exclusivity, unless expressly indicated herein otherwise. These features and elements as well as the operation of the disclosed embodiments will become more apparent in light of the following description and accompanying drawings.

Figure 1:
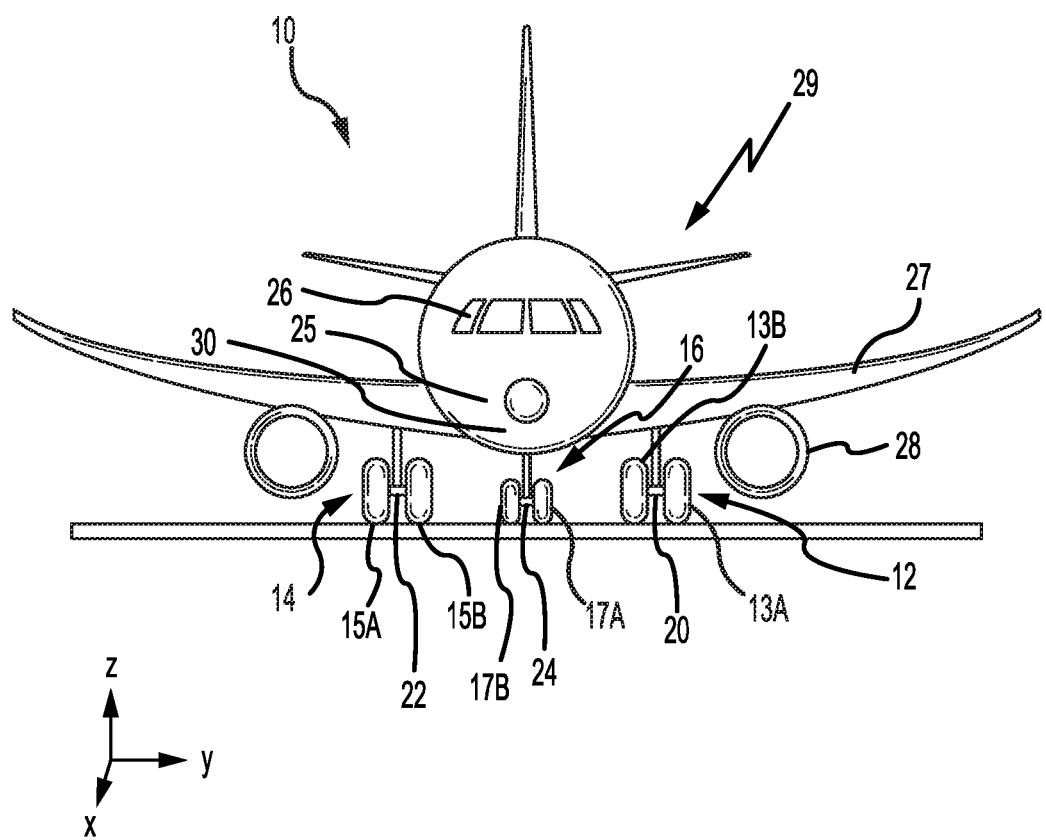
FIG. 1 illustrates an aircraft, in accordance with various embodiments.

The subject matter of the present disclosure is particularly pointed out and distinctly claimed in the concluding portion of the specification. A more complete understanding of the present disclosure, however, may best be obtained by referring to the detailed description and claims when considered in connection with the drawing figures.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein without departing from the spirit and scope of the disclosure. Thus, the detailed description herein is presented for purposes of illustration only and not of limitation.

As used herein, "electronic communication" means communication of electronic signals with physical coupling (e.g., "electrical communication" or "electrically coupled") or without physical coupling and via wireless communication systems or an electromagnetic field (e.g., "inductive communication" or "inductively coupled" or "inductive coupling"). As used herein, "transmit" may include sending electronic data from one system component to another via electronic communication between the components. Additionally, as used herein, "electronic data" may include encompassing information such as commands, queries, files, data for storage, and the like in digital or any other form.

Disclosed herein, according to various embodiments, is a system and method for selectively allocating which friction brakes of a plurality of friction brakes are utilized in response to a braking demand. Said differently, the present disclosure provides a system and method that includes dynamically switching which friction brakes of a plurality of friction brakes are active (e.g., in use) at a given time in response to a braking demand. This dynamic switching may not only be based on the received braking demand (e.g., from a pilot or auto-braking module), but may also be based on one or more of the following: respective measured brake parameters of the plurality of friction brakes (e.g., temperature, extent-of-wear), aircraft parameters, external parameters, and respective calculated brake conditions (e.g., predicted brake temperature). Though numerous details are included herein pertaining to aircraft, the details and embodiments may be implemented in conjunction with other vehicles that utilize multiple friction brakes. That is, the scope of the present disclosure is not necessarily limited to aircraft.

With reference to FIG. 1, an aircraft 10 in accordance with various embodiments of the present disclosure is provided. The aircraft 10 may comprise aircraft systems, for example, landing gear such as landing gear 12, landing gear 14 and landing gear 16. Landing gear 12, landing gear 14 and landing gear 16 may generally support aircraft 10 when aircraft is not flying, allowing aircraft 10 to taxi, take off, and land without damage and may comprise an electronic taxi system. Landing gear 12 may include wheel 13A comprising a friction brake and wheel 13B comprising a friction brake, coupled by an axle 20. Landing gear 14 may include wheel 15A comprising a friction brake and wheel 15B comprising a friction brake, coupled by an axle 22. Landing gear 16 may include nose wheel 17A and nose wheel 17B coupled by an axle 24. The nose wheels 17A, 17B often are do not include friction brakes. An XYZ axes is used throughout the drawings to illustrate the axial (y), forward (x) and vertical (z) directions relative to axle 22.

Aircraft 10 may comprise Brake Control Unit (BCU) 25, cockpit controls 26, aerodynamic surfaces 27, and propulsion system 28. In various embodiments, aerodynamic surfaces 27 may further comprise a spoiler or a speed brake and propulsion system 28 may comprise gas turbine engine and a thrust reverser. Landing gear 14, landing gear 16, and landing gear 12 may be in communication with BCU 25 and may receive commands (e.g. an allocated deceleration effort) from BCU 25, for example, to apply friction brakes. In various embodiments, BCU 25 may be in electronic communication with cockpit controls 26 or may be in electronic communication with external systems via external command signals 29 such as, for example, an aircraft tug operator or a safety emergency instruction issued by an airport ground controller and may allocate deceleration effort in response to pilot cockpit controls 26, external command signals 29, and/or input and feedback from one or more sensors. In various embodiments, the BCU may be in electronic communication with aerodynamic surfaces 27 and propulsion system 28.

In various embodiments, the BCU is typically located in the fuselage of the aircraft. Wires may extend between the fuselage and the BCU at the location of the wheels. Electric signals may be sent and received between the friction brake and the BCU. The BCU may control deceleration using the friction brakes, one or more regenerative brakes coupled to the wheels, and/or the aerodynamic surfaces of the aircraft (i.e., producing aerodynamic drag by spoilers or speed brakes). In various embodiments, electric signals may be sent and received between the BCU and aircraft propulsion system components such as, for example, engine thrust reversers. The BCU may receive signals or commands from a pilot, from sources external to the aircraft, or from any other suitable onboard sensors known to those skilled in the art. For example, the BCU may be in electronic communication with the full suite of aircraft sensors and other data available with the aircraft such as, for example, GPS, radio beacons, remote commands and the like. Sensors may provide aircraft speed, wheel speed, brake temperature, thrust reverser position, acceleration, and any other suitable input data, as described in greater detail below.

Figure 2:
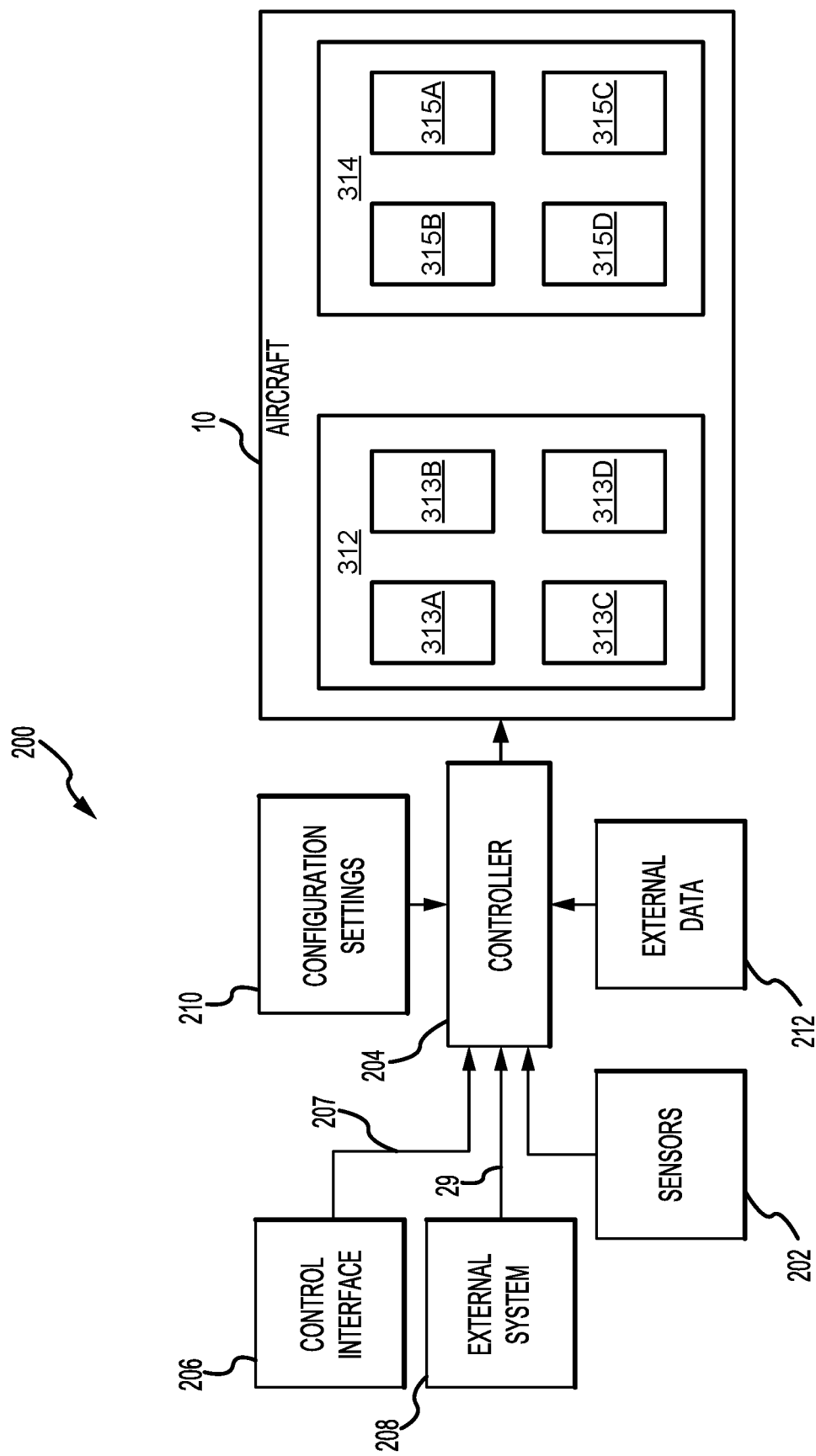
FIG. 2 is a schematic block diagram of a system for selectively allocating which friction brakes of a plurality of friction brakes are active/in-use, in accordance with various embodiments.

In various embodiments, and with reference to FIG. 2, a system 200 for selectively allocating which friction brakes of a plurality of friction brakes 313A, 313B, 313C, 313D, 315A, 315B, 315C, 315D are active/in-use. Said differently, the system 200 is generally configured to optimize an distribute brake usage among the plurality of friction brakes of an aircraft in order to minimize brake and wheel/tire wear, maximize useable life of brakes/wheels, avoid brake overheat, and avoid or at least decrease frequency of unscheduled brake, tire, and wheel maintenance. In various embodiments, and with continued reference to FIG. 2, the aircraft 10 may include two landing gear 312, 314 (which may be similar to landing gear 12, 14 of FIG. 1), and each landing gear 312, 314 may include four wheels and four corresponding friction brakes. For example, left landing gear 312 may include two forward friction brakes (i.e., an outer forward friction brake 313A and an inner forward friction brake 313B) and two aft friction brakes (i.e., an outer aft friction brake 313C and an inner aft friction brake 313D). Similarly, the right landing fear 314 may include two forward friction brakes (i.e., an outer forward friction brake 315A and an inner forward friction brake 315B) and two aft friction brakes (i.e., an outer aft friction brake 315C and an inner aft friction brake 315D). In conventional braking control architecture, these individual brakes may wear unevenly or excessively, thus resulting in the aforementioned problems. The system 200 is generally configured to resolve these problems, in accordance with various embodiments.

As mentioned above a controller 204 may receive inputs and other parameters from a variety of sources, such as a control interface 206, an external system, 208, one or more sensors 202, configuration settings 210, and any other external data 212, and in response to the reception of this information, the controller 204 may selectively allocate which friction brakes to use. For example, the controller 204 may be in electronic communication with a pilot through a control interface 206 of cockpit controls 26, for example, a pedal or set of pedals, that a pilot can operate. The control interface 206 may output a measure of, for example, pedal deflection, and such output may be used as command signals 207. In various embodiments, controller 204 may be in electronic communication with an external system 208 through external command signals 29. In various embodiments, the information or instruction issued by the pilot or the external system is of the form of "decelerate" or "discontinue deceleration." In various embodiments, controller 204 may be in electronic communication with configuration settings 210 or library values used by a friction brake temperature model, a brake temperature optimization algorithm, or other algorithm. In various embodiments, controller 204 may be in electronic communication with external data 212 sources which may be used by an algorithm such as, for example, near real time runway condition data from other aircraft, weather condition data, and/or fuel price data, as described in greater detail below.

The controller 204 of system 200 may be the BCU 25 of FIG. 1, or the controller 204 may be coupled in electronic communication with the BCU 25. In various embodiments, controller 204 may be integrated into computer systems onboard an aircraft, such as, for example, BCU 25. In various embodiments, controller 204 may comprise a processor. In various embodiments, controller 204 may be implemented in a single processor. In various embodiments, controller 204 may be implemented as and may include one or more processors and/or one or more tangible, non-transitory memories and be capable of implementing logic. Each processor can be a general purpose processor, a digital signal processor (DSP), an application specific integrated circuit (ASIC), a field programmable gate array (FPGA) or other programmable logic device, discrete gate or transistor logic, discrete hardware components, or any combination thereof. Controller 204 may comprise a processor configured to implement various logical operations in response to execution of instructions, for example, instructions stored on a non-transitory, tangible, computer-readable medium configured to communicate with controller 204.

System program instructions and/or controller instructions may be loaded onto a non-transitory, tangible computer-readable medium having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

In various embodiments, the controller 204 may receive a braking demand and may selectively allocate which friction brakes of the plurality of friction brakes are utilized in response to the braking demand. For example, during taxi operation, the controller 204 may dynamically switch which friction brakes are active/useable, thus optimizing brake wear by sharing braking function and reducing the individual brake cycles to the plurality of the friction brakes. In various embodiments, the selective allocation performed by the controller 204 includes activating a first set of friction brakes (which may include a single friction brake) in response to the braking demand while another set of friction brakes (which may include a different single friction brake) is not utilized (e.g., deactivated). In various embodiments, the controller 204 includes a continuous switching of which brakes are active unless other received inputs/parameters dictate otherwise. That is, in various embodiments, the controller 204 may be configured to continuously (at certain intervals) activate successive sets of friction brakes. This pattern of continuous and successive braking function allocation may be interrupted and/or superseded by the controller's receipt of various other inputs/parameters, as described below.

In various embodiments, the selective allocation of brake activation performed by the controller 204 is dependent upon measured brake parameters, such as temperature and extent-of-wear. For example, the aircraft may include a plurality of temperature sensors respectively coupled to the plurality of friction brakes. Each temperature sensor of the plurality of temperature sensors may be configured to measure a temperature of a respective friction brake of the plurality of friction brakes. In various embodiments, the friction brakes may comprise a brake material that includes at least one of a composite material, a carbon material, a carbon/carbon composite material, a silicon-carbide, a ceramic, or other suitable material known to those skilled in the art. In response to the deceleration effort allocated by the BCU, the friction brakes tend to absorb energy from the wheel(s) tending to increase the temperature of the brake material. In various embodiments, the performance of the friction brakes is a function of brake material temperature and the brake material may undergo excessive wear if not within a desired range/threshold.

In various embodiments, the respective measured brake parameters comprise the temperatures of the plurality of friction brakes from the plurality of temperature sensors. In various embodiments, selectively allocating (by the controller) comprises switching which friction brakes of the plurality of friction brakes are active to achieve and maintain the temperature of the plurality of friction brakes (or a subset of the plurality of friction brakes) within a range. This range may have a minimum temperature and a maximum temperature. For example, the range may include a minimum temperature of about 100° F. and a maximum temperature of about 2,000° F. In various embodiments, the range comprises a minimum temperature and a maximum temperature, wherein the minimum temperature is about 200° F. and the maximum temperature is about 1,500° F. In further embodiments, the range comprises a minimum temperature and a maximum temperature, wherein the minimum temperature is about 200° F. and the maximum temperature is about 1,000° F. As used in this context only, the term "about" refers to plus or minus 10% of the indicated value.

In various embodiments, the system further comprises a plurality of brake-wear sensors (e.g., sensors 202) respectively coupled to the plurality of friction brakes, wherein each brake-wear sensor of the plurality of brake-wear sensors is configured to measure an extent-of-wear of a respective friction brake of the plurality of friction brakes. Accordingly, the respective measured brake parameters upon which the selective allocation operation is based may include the extent-of-wear of the plurality of friction brakes from the plurality of brake-wear sensors. Accordingly, selectively allocating, by the controller, comprises dynamically switching which friction brakes of the plurality of friction brakes are active in response to the extent-of-wear of the plurality of friction brakes to distribute and stagger (if desired) wear to the plurality of friction brakes. In various embodiments, distributing the wear among the plurality of friction brakes includes substantially unevenly distributing wear to prevent or at least inhibit more than one of the friction brakes from wearing out at nearly the same time. In various embodiments, a left and a right brake pedal may be individually controlled. Forward or aft brake pairs on the respective left/right sides may be switched in response to the brake pedal reaching a pre-defined brake pedal command %. In various embodiments, switching which brakes are active (or which subset of brakes are active) occurs when a brake pedal is cycled from "off" to "on" (e.g., between brake cycles).

In various embodiments, the system 200 may include one or more aircraft sensors that are configured to measure an aircraft parameter of the aircraft. These aircraft parameters may be received by the controller and utilized to determine how to allocate braking function among the plurality of friction brakes. The aircraft parameter may be at least one of a ground speed, a weight, a thrust reverser position, a spoiler position, a gas turbine engine power/speed setting, an auto-brake setting, a GPS location, an aircraft direction, and a braking configuration, among others. In various embodiments, the operations performed by the controller may include receiving an external parameter (e.g., from an external system 208 or other external data 212) and performing the selective allocation in response to the external parameter. In various embodiments, the external parameter includes at least one of an outside air temperature, an outside humidity, a vehicle altitude/pressure, an outside wind speed/direction, an arrival/departure airport/runway/gate and a target brake wear % for each individual brake. In various embodiments, the external parameters further include an airport topographical map (to account for gravity/grade effects).

In various embodiments, the operations of the controller 204 may include generating respective calculated brake conditions of the plurality of friction brakes in response to the braking demand and the respective measured brake parameters. That is, the controller 204 may determine expected brake conditions, based on the braking demand and the aforementioned parameters received by one or more sensors or from external sources, and these expected brake conditions may contribute to the selective allocation performed by the controller. That is, the controller may dynamically switch which friction brakes of the plurality of friction brakes are active in response to the respective calculated brake conditions of the plurality of friction brakes. In various embodiments, the expected brake conditions may be referred to as a brake prediction or a brake temperature prediction. In various embodiments, the controller 204 may include a brake temperature prediction module configured to predict the brake energy/temperature based on one or more of the aforementioned parameters (e.g., because measured/actual brake temperature may lag several minutes, thus warranting a brake temperature prediction to be used in the brake allocation. In various embodiments, the controller 204 may utilize various configuration models to determine the brake temperature prediction. For example, the controller may include brake wear rate/control models to minimize overall brake wear rate and maximize brake life, to control individual brake wear % and avoid engine-indicate and crew-alerting systems (EICAS) low brake % alerting thresholds. The brake wear rate/control models may be configured to support fleet/vehicle maintenance planning (e.g., add brake wear-out control to such maintenance planning). Further, the brake temperature control model may be configured to minimize overall brake wear rate and avoid individual brake high temperature EICAS alerting thresholds, etc. That is, these models and data may be utilized by the controller 204 to determine the selective allocation of brake function.

Figure 3:
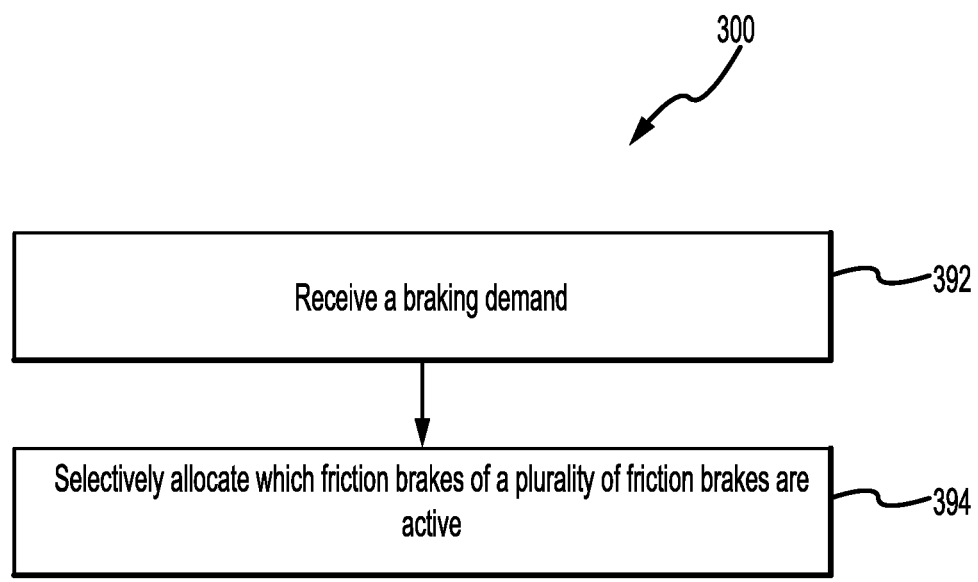
FIG. 3 is a schematic flowchart diagram of a method for selectively allocating which friction brakes of a plurality of friction brakes are active/in-use, in accordance with various embodiments.

In various embodiments, and with reference to FIG. 3, a method 300 for selective allocation of brake function is provided. The method 300 may include receiving, by a controller, a braking demand at step 392 and selectively allocating, by the controller, which friction brakes of a plurality of friction brakes are utilized in response to the braking demand at step 394. In various embodiments, the method may further include receiving, by the controller, measured respective brake parameters of the plurality of friction brakes, wherein selectively allocating, by the controller, comprises dynamically switching which friction brakes of the plurality of friction brakes are active in response to the respective measured brake parameters of the plurality of friction brakes. In various embodiments, the method 300 further includes generating respective calculated brake conditions of the plurality of friction brakes in response to the braking demand and the respective measured brake parameters, wherein selectively allocating, by the controller, comprises dynamically switching which friction brakes of the plurality of friction brakes are active in response to the respective calculated brake conditions of the plurality of friction brakes. Still further, the method 300 may include receiving, by the controller, at least one of an aircraft parameter and an external parameter, wherein selectively allocating, by the controller, comprises dynamically switching which friction brakes of the plurality of friction brakes are active in response to the aircraft parameter and the external parameter.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

The steps recited in any of the method or process descriptions may be executed in any order and are not necessarily limited to the order presented. Furthermore, any reference to singular includes plural embodiments, and any reference to more than one component or step may include a singular embodiment or step. Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

Any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts or areas but not necessarily to denote the same or different materials. In some cases, reference coordinates may be specific to each figure.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An aircraft comprising:
    a landing gear comprising a plurality of wheels;
    a plurality of friction brakes respectively coupled to the plurality of wheels, each friction brake of the plurality of friction brakes comprising a brake material coupled to a respective wheel of the plurality of wheels;
    a controller; and
    a tangible, non-transitory memory configured to communicate with the controller, the tangible, non-transitory memory having instructions stored thereon that, in response to execution by the controller, cause the controller to perform operations comprising:
        receiving, by the controller, a braking demand;
        determining, by the controller, a target brake wear percentage for each friction brake of the plurality of friction brakes; and
        selectively allocating, by the controller, which friction brakes of the plurality of friction brakes are utilized in response to the braking demand la dynamically switching which friction brakes of the plurality of friction brakes are active based on the target brake wear percentage and respective measured brake parameters of the plurality of friction brakes.

2. The aircraft of claim 1, wherein selectively allocating, by the controller, comprises selective activation of a first set of friction brakes of the plurality of friction brakes in response to the braking demand, wherein the first set of friction brakes comprises less than all friction brakes of the plurality of friction brakes such that a second set of friction brakes, which may include a single friction brake, is not utilized in response to the braking demand.

3. The aircraft of claim 1, further comprising a plurality of temperature sensors respectively coupled to the plurality of friction brakes, wherein each temperature sensor of the plurality of temperature sensors is configured to measure a temperature of a respective friction brake of the plurality of friction brakes, wherein the respective measured brake parameters comprise the temperatures of the plurality of friction brakes from the plurality of temperature sensors.

4. The aircraft of claim 3, wherein selectively allocating, by the controller, comprises dynamically switching which friction brakes of the plurality of friction brakes are active to maintain the temperature of the plurality of friction brakes within a range.

5. The aircraft of claim 4, wherein the range comprises a minimum temperature and a maximum temperature, wherein the minimum temperature is about 100° F. and the maximum temperature is about 2,000° F.

6. The aircraft of claim 4, wherein the range comprises a minimum temperature and a maximum temperature, wherein the minimum temperature is about 200° F. and the maximum temperature is about 1,500° F.

7. The aircraft of claim 4, wherein the range comprises a minimum temperature and a maximum temperature, wherein the minimum temperature is about 200° F. and the maximum temperature is about 1,000° F.

8. The aircraft of claim 1, further comprising a plurality of brake-wear sensors respectively coupled to the plurality of friction brakes, wherein each brake-wear sensor of the plurality of brake-wear sensors is configured to measure an extent-of-wear of a respective friction brake of the plurality of friction brakes, wherein the respective measured brake parameters comprise the extent-of-wear of the plurality of friction brakes from the plurality of brake-wear sensors.

9. The aircraft of claim 1, further comprising an aircraft sensor configured to measure an aircraft parameter of the aircraft, wherein the operations comprise receiving, by the controller, the aircraft parameter such that dynamically switching which friction brakes of the plurality of friction brakes are active is in response to the aircraft parameter.

10. The aircraft of claim 9, wherein the aircraft parameter is at least one of a ground speed, a weight, a thrust reverser position, a spoiler position, a gas turbine engine power/speed setting, an auto-brake setting, and a braking configuration.

11. The aircraft of claim 1, wherein the operations comprise receiving, by the controller, an external parameter such that dynamically switching which friction brakes of the plurality of friction brakes are active is in response to the external parameter.

12. The aircraft of claim 11, wherein the external parameter is at least one of an outside air temperature, an outside humidity, an outside altitude/pressure, an outside wind speed/direction, and an arrival/departure airport/runway/gate.

13. The aircraft of claim 12, wherein the operations comprise generating respective calculated brake conditions of the plurality of friction brakes in response to the braking demand and the respective measured brake parameters such that dynamically switching which friction brakes of the plurality of friction brakes are active is in response to the respective calculated brake conditions of the plurality of friction brakes.

14. A method, comprising:
receiving, by a controller, a braking demand;
determining, by the controller, a target brake wear percentage for each friction brake of a plurality of friction brakes;
receiving, by the controller, at least one of a temperature signal or an extent-of-wear signal for each friction brake of the plurality of friction brakes; and
selectively allocating, by the controller, which friction brakes of the plurality of friction brakes are utilized in response to the braking demand based on the target brake wear percentage and the least one of the temperature signal or the extent-of-wear signal for each friction brake of the plurality of friction brakes.

15. The method of claim 14, wherein the selectively allocating, by the controller, comprises dynamically switching which friction brakes of the plurality of friction brakes are active in response to the target brake wear percentage and the least one of the temperature signal or the extent-of-wear signal for each friction brake of the plurality of friction brakes.

16. The method of claim 15, further comprising generating respective calculated brake conditions of the plurality of friction brakes in response to the braking demand and the at least one of the temperature signal or the extent-of-wear signal for each friction brake, wherein the selectively allocating, by the controller, comprises dynamically switching which friction brakes of the plurality of friction brakes are active in response to the respective calculated brake conditions of the plurality of friction brakes.

17. The method of claim 15, further comprising receiving, by the controller, at least one of an aircraft parameter and an external parameter, wherein the selectively allocating, by the controller, comprises dynamically switching which friction brakes of the plurality of friction brakes are active in response to the aircraft parameter and the external parameter.

18. An article of manufacture including a tangible, non-transitory computer-readable storage medium having instructions stored thereon that, in response to execution by a processor, cause the processor to perform operations comprising:
receiving, by the processor, a braking demand;
determining, by the processor, a target brake wear percentage for each friction brake of a plurality of friction brakes;
receiving, by the processor, a temperature signal for each friction brake of the plurality of friction brakes;
receiving, by the processor, an extent-of-wear signal for each friction brake of the plurality of friction brakes; and
selectively allocating, by the processor, which friction brakes of the plurality of friction brakes are utilized in response to the braking demand based on the target brake wear percentage, the temperature signal, and the extent-of-wear signal.

19. The article of manufacture of claim 18, wherein the operations further comprise receiving, by the processor, at least one of an aircraft parameter, and an external parameter, wherein selectively allocating, by the processor, comprises dynamically switching which friction brakes of the plurality of friction brakes are active based on the target brake wear percentage, the temperature signal, the extent-of-wear signal, and the least one of the aircraft parameter and the external parameter.

* * * * *